(No Model.)
S. H. SHORT.
INSULATING JOINT.
No. 438,495. Patented Oct. 14, 1890.
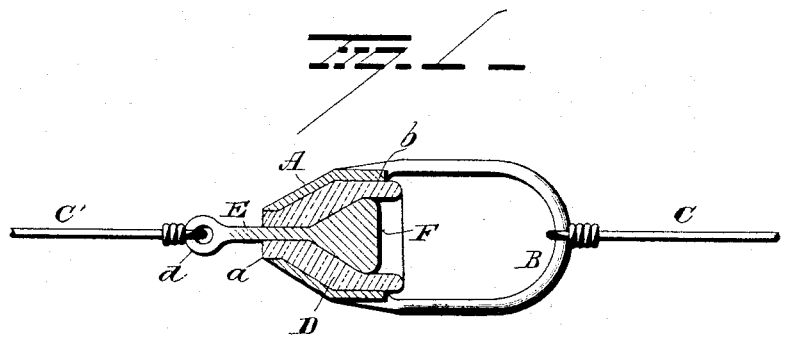
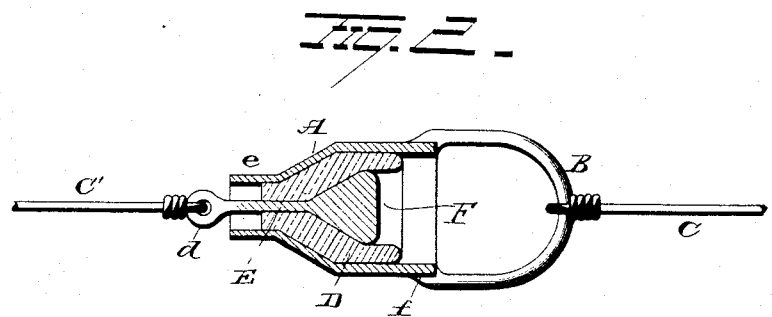
Witnesses
G. H. Nottingham
G. F. Downing
Inventor
Sidney H. Short.
By his Attorney

UNITED STATES PATENT OFFICE.

SIDNEY H. SHORT, OF CLEVELAND, OHIO.

INSULATING-JOINT.

SPECIFICATION forming part of Letters Patent No. 438,495, dated October 14, 1890.

Application filed December 10, 1889. Serial No. 333,255. (No model.)

*To all whom it may concern:*

Be it known that I, SIDNEY H. SHORT, of Cleveland, in the county of Cuyahoga and State of Ohio, have invented certain new and useful Improvements in Insulated Joints; and I do hereby declare the following to be a full, clear, and exact description of the invention, such as will enable others skilled in the art to which it appertains to make and use the same.

My invention relates to an insulator-joint for use in connecting the two ends of a wire which has considerable strain imposed upon it; and the invention consists in certain features of construction and combinations of parts, as will be hereinafter explained, and pointed out in the claims.

In the accompanying drawings, Figure 1 is a view in longitudinal section of my improvement, and Fig. 2 is a modification.

A represents a conical-shaped casing, preferably made of cast metal and formed with open ends $a$ $b$, the larger end $b$ being provided with a bail B, to which one end C of the wire is fastened.

Within the conical or funnel-shaped casing is placed a funnel-shaped lining D, made of any suitable insulating material—as, for instance, of glass or pottery. The lining D has molded therein or surrounds and forms a bearing for a metal shank E, which is provided with a head F, the diameter of which exceeds the diameter of the smaller open end $a$ of the casing, so that in the event the insulating-lining should become broken or crushed by the strain imparted to it, or for any other reason, the shank will still be retained within the casing. The outer end of the shank is constructed with an eye $d$, to which is fastened the other end C' of the wire to be connected. This construction insures a strong and reliable insulated joint, and one in which the ends of the wires will still be connected, even though the insulation should become crushed or broken.

In Fig. 2, casing A is provided with extensions $e f$ at its opposite ends, which project over and shield the opposite ends of the insulating-lining.

In either construction the bail may be cast integral with the casing, or it may be made separate therefrom and secured to the casing by riveting, or the ends of the bail may be pivotally connected with the casing.

As it is evident that many slight changes in the construction, form, and arrangement of the parts might be resorted to without departing from the invention, I would have it understood that I do not restrict myself to the particular construction shown and described; but, Having fully described my invention, what I claim as new, and desire to secure by Letters Patent, is—

1. In an insulated joint, the combination, with a metal casing having open ends and provided with a bail at one end, of an insulated lining or block secured within the casing and a shank projecting from said casing at one end, the head of said shank being embedded in the insulated lining, substantially as set forth.

2. In an insulated joint, the combination, with a metal casing having open ends of unequal diameter and a bail adjacent to the larger opening, of an insulating lining or block secured within the casing and a shank the head of which has bearing against the insulated block, the said shank projecting through the smaller opening of the casing, substantially as set forth.

3. In an insulated joint the combination, with a metal casing having open ends of unequal diameters and a bail adjacent to the larger opening, of an insulating-block located within the casing and a shank passing through the smaller opening, the head of said shank being embedded in the insulating material, substantially as set forth.

In testimony whereof I have signed this specification in the presence of two subscribing witnesses.

SIDNEY H. SHORT.

Witnesses:
 JOHN C. DOLPH,
 W. A. PALLAUT.